Feb. 6, 1923.

A. H. WADELL.
PISTON RING.
FILED OCT. 11, 1920.

1,444,046

INVENTOR
Albert H. Wadell
BY Fred'k C. Fischer
ATTORNEY

Patented Feb. 6, 1923.

1,444,046

UNITED STATES PATENT OFFICE.

ALBERT H. WADELL, OF NEWARK, NEW JERSEY, ASSIGNOR TO ABSO-SEAL JOINT PISTON RING CORPORATION, OF NEWARK, NEW JERSEY, A CORPORATION OF NEW JERSEY.

PISTON RING.

Application filed October 11, 1920. Serial No. 416,097.

*To all whom it may concern:*

Be it known that I, ALBERT H. WADELL, a citizen of the United States, residing in the city of Newark, county of Essex, and State of New Jersey, have invented certain new and useful Improvements in Piston Rings, of which the following is a full, clear, and exact description, such as will enable others skilled in the art to which it pertains to make, construct, and use the same, reference being had to the accompanying drawings, and to numerals of reference marked thereon, forming a part of this specification.

My invention relates to improvements in piston rings, and more particularly to rings of that class which are adapted to be used in internal combustion engines.

The invention has for its object to provide a ring of the character specified, which while flexible, contractible, and expansible to permit its easy insertion and removal will yet make a fluid tight joint both between the piston and the cylinder walls and between the ring and the piston, and wherein the arrangement is such that there is nothing to score or cut the cylinder wall during the reciprocation of the piston.

With these ends in view, my invention consists in certain novelties of construction and arrangements of parts as hereinafter set forth and pointed out in the claims.

While the preferred form of my invention is illustrated in the accompanying drawings, yet it is to be understood that minor changes may be made without departing from the scope thereof.

In the drawings.

Similar numerals of reference refer to like parts throughout the specification and drawings.

Figure 1:
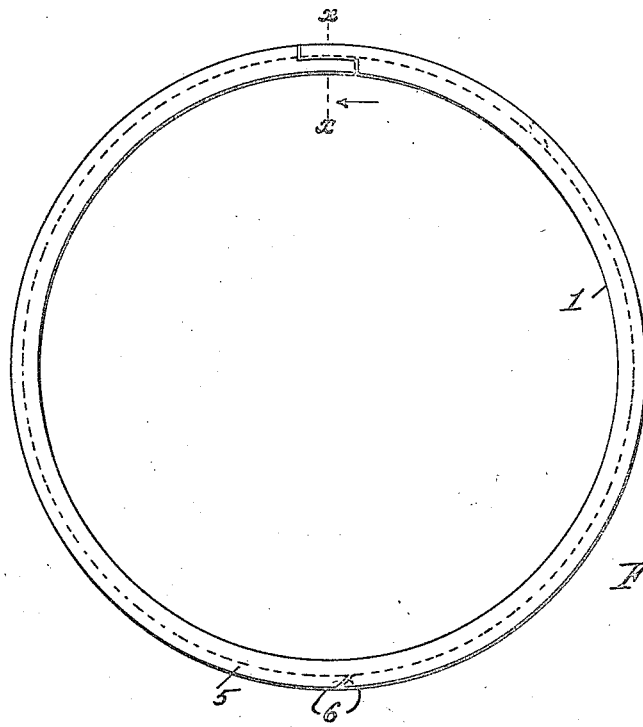
Figure 1 represents, a side elevation of a piston ring constructed in accordance with the invention.
Figure 2:
Figure 2 represents, a plan view of the same.
Figure 3:
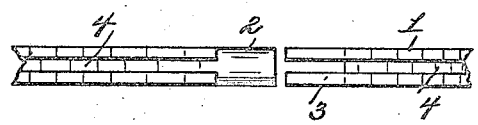
Figure 3 represents, a fragmentary plan view of the ends of the ring in open position with the sealing ring removed.
Figure 4:
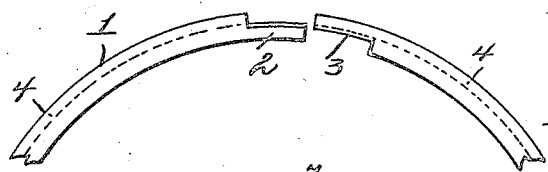
Figure 4 represents, a side elevation of the same.

In the drawings, 1 represents a piston ring, preferably composed of comparatively soft, smooth wearing metal, such as cast iron of proper quality, although any other suitable material may be employed, if desired.

Figure 5:
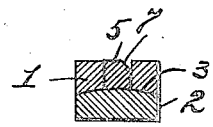
Figure 5 represents, on an enlarged scale, a transverse section taken on line *x—x* of Figure 1, looking in the direction indicated by the arrow.

The ends of the ring overlap, so as to form a lap joint, and consists of a tongue 2, provided with a convex upper surface, and a tongue 3 provided with a concave under surface designed so that when the ring is closed and the tongue 2 overlaps the tongue 3 a fluid tight joint is provided, as clearly indicated in Figures 1 and 5 of the drawings.

The ring is further provided in its outer circumferential surface with a groove 4 designed to receive a split sealing ring 5.

The sealing ring 5 is preferably formed of spring material and the out-side diameter of the ring is preferably a few thousandths of an inch larger in diameter than the out-side diameter of the piston ring.

The ends of the ring 5 are provided with beveled ends 6 so as to overlap and form a tight joint. The upper edge of the ring 5 is preferably beveled as at 7 as clearly indicated in Figure 5 of the drawings. This beveled edge forms an oil seal and also prevents the gas from escaping.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claim.

Having thus described my invention, what I claim as new and desire to secure by Letters Patent is:—

A packing ring comprising a split ring having end portions provided with overlapping tongues, one entire surface of one tongue being concaved and the entire contacting surface of the other tongue being convexed and bifurcated, a peripheral groove formed in the outer surface of said ring, a split sealing ring formed of spring material seated in said peripheral groove, said ring being provided with overlapping ends, and an outer beveled edge.

This specification signed and witnessed this seventh day of October, 1920.

ALBERT H. WADELL.

Witnesses:
EDWARD A. GITT,
FRED EVANS.